(No Model.)
F. L. KIRKBRIDE.
VEHICLE WHEEL.
No. 333,759. Patented Jan. 5, 1886.
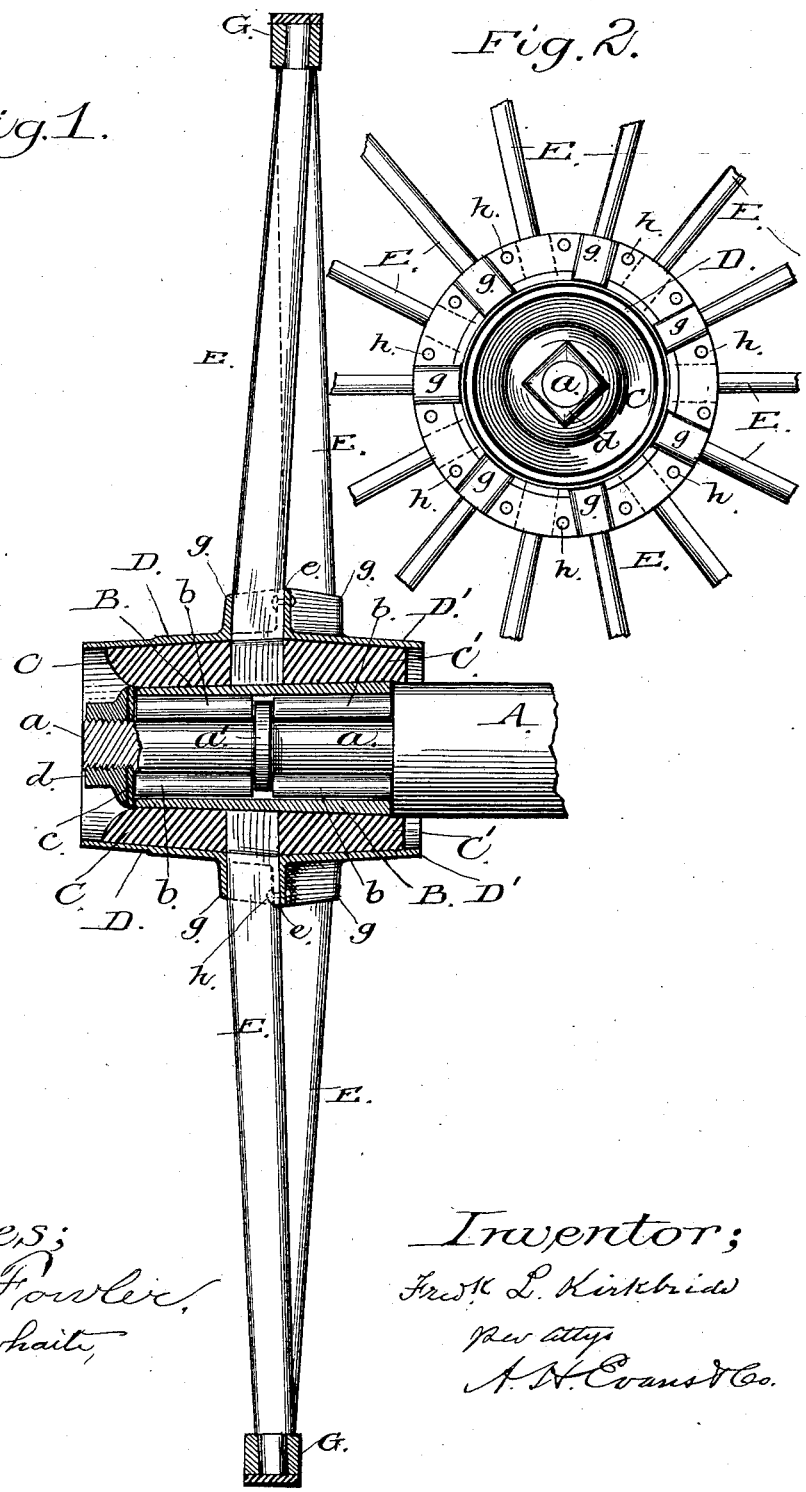

UNITED STATES PATENT OFFICE.

FREDERICK L. KIRKBRIDE, OF WYANDOTTE, KANSAS, ASSIGNOR OF ONE-HALF TO W. C. DUVALL, OF KANSAS CITY, MISSOURI.

VEHICLE-WHEEL.

SPECIFICATION forming part of Letters Patent No. 333,759, dated January 5, 1886.

Application filed February 2, 1885. Serial No. 154,688. (No model.)

*To all whom it may concern:*

Be it known that I, FREDERICK L. KIRKBRIDE, a citizen of the United States, residing at Wyandotte, in the county of Wyandotte and State of Kansas, have invented certain new and useful Improvements in Vehicle-Wheels, of which the following is a full, clear, and exact description, reference being had to the accompanying drawings, forming part of this specification, in which—

Figure 1 is a vertical sectional view of a vehicle-wheel with my improvements attached. Fig. 2 is a side elevation of the hub and portions of the spokes.

My invention relates to vehicle-wheels having a double series of spokes securely held in bearings formed on metal flanges, which constitute the exterior of the hub; and my invention consists in the construction, arrangement, and combination of devices, all of which will be hereinafter fully described and claimed.

To enable others skilled in the art to make and use my invention, I will now proceed to describe the exact manner in which I have carried it out.

In the said drawings A represents a vehicle-axle provided with spindle *a*. This spindle is of ordinary construction, except that it has cast or otherwise formed at or about its longitudinal center a collar, *a'*, the purpose of which will be hereinafter fully described. Within the interior of the hub is placed a metal boxing, B, whose inside diameter is considerably greater than the outside diameter of the spindle. This construction enables me to interpose between the metallic boxing B and the spindle *a* a double series of anti-friction rollers, *b*, loosely mounted and arranged upon each side of the longitudinal center of the spindle, each series being separated from the other by the collar *a'* on the spindle, but permitted to run loose, as they are not confined by guides or other devices, as is the case with some of the journal-bearings now in use.

The devices above referred to are held in their proper places by a washer, *c*, and a nut, *d*, adapted to engage the threaded end of the spindle, the nut being provided with means whereby it may be removed by the use of a wrench in the usual manner.

C C' represent the wooden hub, preferably divided into two parts, as shown, and mortised to receive the tenons on the inner ends of the spokes.

Upon the outside of the wooden hub, and constituting the exterior of the hub proper, are the metal flanges D D', arranged in a manner similar to that shown in Fig. 1. These flanges D D' are of peculiar construction and have their inner or meeting faces, *e*, straight, so as to bear closely against each other and hold the inner ends of the spokes E firmly together. The flanges D D' are also formed with a series of offsets or bearings, *g*, into which the ends of the spokes are driven, the offsets on each flange corresponding with the number of spokes of each series. When the flanges D D' are placed in position, they are held by means of bolts *h*, thereby forming a strong and substantial water-proof hub, and one that will not easily get out of repair. The spokes E, after their ends have been forced into the offsets, are slightly bent, so that the outer end of each spoke will point to the center of the rim G, around which is placed the ordinary tire.

As before stated, I construct my wheel with wooden hub. The spokes are driven in the mortises formed in the hub, and the rim fitted on. When this is done, the flanges are expanded and then pressed into place with considerable force, and then securely held there by bolts or rivets, which pass through the flanges between each of the spokes.

The axle I prefer to construct with a straight spindle, with the collar in its center, as described, and over this spindle is placed the metallic boxing, with sufficient space between it and the spindle to place the continuous sets of rollers. These rollers are placed around the spindle and held while the boxing is slipped over them. The washer and nut are then placed in position and the wheel finished.

It is evident the construction herein described may be applied to the journals of railway-cars with but a slight change and without departing from the spirit of my invention.

I am aware journal-boxes have been provided with anti-friction rollers, and I therefore do not broadly claim such construction as my invention; but What I do claim, and desire to secure by Letters Patent, is—

The combination of a hub and axle, a spindle having a collar at or near its center, a double series of loosely-mounted rollers located upon each side of the collar and between the securing and main portion of the axle, and adapted to travel around an inclosing-shell and change their position, as herein described.

FREDERICK L. KIRKBRIDE.

Witnesses:
WILLIAM A. KERR,
H. H. SMITH.